(No Model.)

J. P. FARMER.
CANCELING DEVICE FOR POSTAGE, REVENUE AND OTHER STAMPS.

No. 244,574. Patented July 19, 1881.

Attest:
Geo. T. Smallwood Jr.
Walter Allen

Inventor
John P. Farmer
By Knight Bros.
Attys.

UNITED STATES PATENT OFFICE.

JOHN P. FARMER, OF PENN YAN, NEW YORK, ASSIGNOR OF TWO-THIRDS TO DAVID J. FARMER AND SAMUEL FARMER, OF SAME PLACE.

CANCELING DEVICE FOR POSTAGE, REVENUE, AND OTHER STAMPS.

SPECIFICATION forming part of Letters Patent No. 244,574, dated July 19, 1881.

Application filed November 20, 1880. (No model.)

*To all whom it may concern:*

Be it known that I, JOHN P. FARMER, of Penn Yan, in the county of Yates and State of New York, have invented an Improvement in Canceling Devices for Postage, Revenue, and other Stamps, of which the following is a specification.

My invention has for its object the adaptation of those cancelers which are furnished with cutter-shafts to stamps of considerable length, the canceler being drawn along over the stamp for the purpose of abrading or scraping, instead of cutting into the stamp sufficiently to come in contact with the adhesive material. In this, as well as in my previous device, (subject of my application for Letters Patent filed November 20, 1880,) the stock or box of the canceler rests on the stamp, while the cutters abrade the surface by being pressed lightly thereon by a suitable spring.

My improvement consists in a canceler having a vertical stock or box adapted to rest on the stamp, a handle projecting horizontally from one side thereof, a frame adapted to slide within said box, a shaft provided with abrading or scraping cutting-disks, and journaled in said frame and adapted to be rotated by suitable coupling to a pulley, flexible shaft, or band connecting with a motor, adjusting-screws for regulating the projection of the cutting-disks, and springs for pressing the sliding frame outward.

In order that my invention may be fully understood, I will proceed to describe it with reference to the accompanying drawings, in which—

Figure 1:
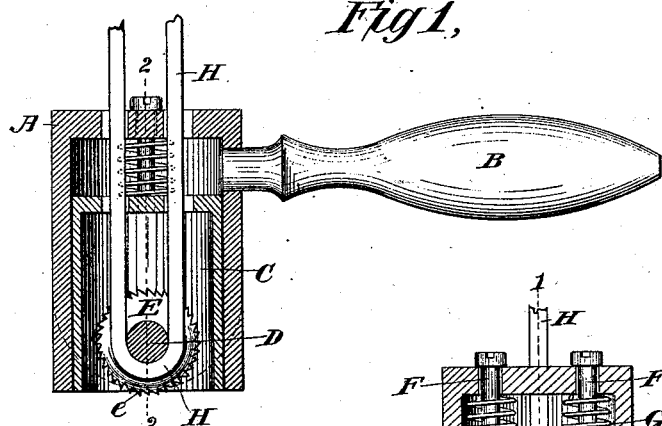
Figure 2:
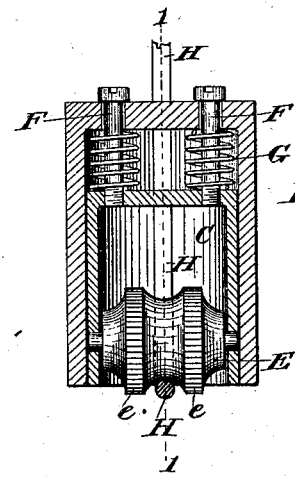
Figure 3:
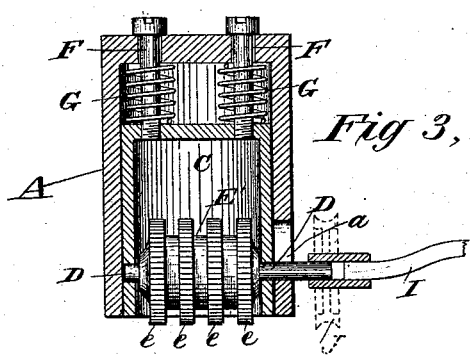
Figure 4:
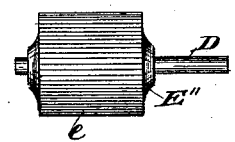

Figure 1 is a vertical section of my improved canceler on the line 1 1, Fig. 2, indicating in dotted lines how the stock or box may conform to the curve of the disks. Fig. 2 is a vertical section on the line 2 2, Fig. 1. Fig. 3 is a vertical section on the line 2 2, Fig. 1, showing additional cutting-disks mounted on a shaft adapted to be continuously rotated by a flexible shaft or pulley. Fig. 4 is a side view of a shaft having a cylinder surrounding it provided with cutting-edges.

A may represent the stock or box, provided with a handle, B. Sliding within the stock is a frame, C, forming bearings for a horizontal shaft, D, having cutting-disks E' mounted thereon, as shown in Fig. 3, or in one piece therewith, E, as shown in Figs. 1 and 2; or the cutting-edges may be formed on a cylinder, E'', as shown in Fig. 4.

The frame C may be supported by bolts F passed through the top of the stock A and sliding therethrough. The disk-cutting edges $e$ are projected by springs G, coiled around the bolts F, and working between the inner side of the top of the stock and the top of the frame C.

The shaft D may be rotated by an endless belt, H, as shown in Figs. 1 and 2, or the shaft may extend through a slot, $a$, in the side of the stock, as shown in Fig. 3, and be coupled to a flexible shaft, I, or pulley, J, as shown in dotted lines.

The shaft D may be provided with one or more of the disks E.

This device is especially adapted to the cancellation of long stamps, as the cuts are made parallel in straight lines instead of radial, as in my previous device.

Having thus described my invention, the following is what I claim as new and desire to secure by Letters Patent:

The combination of stock A, handle B, shaft D, disks E $e$, sliding frame C, adjusting-screws F F, and springs G G, as set forth.

JOHN P. FARMER.

Witnesses:
 WALTER ALLEN,
 HARRY E. KNIGHT.